United States Patent
Talda et al.

(10) Patent No.: US 12,128,980 B2
(45) Date of Patent: Oct. 29, 2024

(54) APPARATUSES AND METHODS FOR CRANK-BASED LIGHTING

(71) Applicant: MCKT Products LLC, Renton, WA (US)

(72) Inventors: Timothy Alan Talda, Seattle, WA (US); Katherine Anne Talda, Seattle, WA (US)

(73) Assignee: MCKT Products LLC, Renton, WA (US)

( * ) Notice: Subject to any disclaimer, the term of this patent is extended or adjusted under 35 U.S.C. 154(b) by 0 days.

(21) Appl. No.: 17/770,587

(22) PCT Filed: Oct. 20, 2020

(86) PCT No.: PCT/US2020/056516
§ 371 (c)(1),
(2) Date: Apr. 20, 2022

(87) PCT Pub. No.: WO2021/080995
PCT Pub. Date: Apr. 29, 2021

(65) Prior Publication Data
US 2022/0289326 A1    Sep. 15, 2022

Related U.S. Application Data

(60) Provisional application No. 62/923,586, filed on Oct. 20, 2019.

(51) Int. Cl.
*B62J 6/26*      (2020.01)
*B62J 6/015*     (2020.01)
(Continued)

(52) U.S. Cl.
CPC ............ *B62J 6/26* (2020.02); *B62J 6/015* (2020.02); *B62J 45/421* (2020.02); *B62M 3/08* (2013.01);
(Continued)

(58) Field of Classification Search
CPC .............. B62J 6/26; B62J 6/56; B62J 6/57
See application file for complete search history.

(56) References Cited

U.S. PATENT DOCUMENTS 5,027,303 A    6/1991   Witte
5,902,038 A *  5/1999   Curry .................. B62J 6/26
                                              362/802

(Continued)

FOREIGN PATENT DOCUMENTS

CN    207580069      7/2018
DE    102004034340   2/2006
(Continued)

OTHER PUBLICATIONS

"International Search Report and Written Opinion", PCT Application No. PCT/US2020/056516, Feb. 19, 2021, 10 pages.
(Continued)

*Primary Examiner* — Julie A Bannan
(74) *Attorney, Agent, or Firm* — Colby Nipper PLLC

(57) ABSTRACT

The present disclosure describes various aspects of crank-based lighting, which may improve visibility of pedal-based vehicles or conveyances. In some aspects, a light generating apparatus includes a crank interface and lighting system. The crank interface may facilitate mounting of the apparatus to a crank (or crankarm) of a bicycle or other pedal-based vehicle. The lighting system may generate or emit light based on information indicating an angle, movement, and/or position of the crank, such as to cause light emission to emulate or project leg movement of a rider.

20 Claims, 7 Drawing Sheets

(51) Int. Cl.
*B62J 45/421* (2020.01)
*B62M 3/08* (2006.01)
*F21V 21/088* (2006.01)
*H05B 47/115* (2020.01)

(52) U.S. Cl.
CPC .......... *F21V 21/088* (2013.01); *H05B 47/115* (2020.01)

(56) References Cited

U.S. PATENT DOCUMENTS

| 8,132,945 | B2 * | 3/2012 | Lunde | ...................... B62M 3/12 362/183 |
| 2014/0354419 | A1 * | 12/2014 | Frier | ...................... B60R 25/10 340/432 |
| 2018/0268668 | A1 | 9/2018 | Tetsuka | |

FOREIGN PATENT DOCUMENTS

| DE | 202013101731 | | 5/2013 | |
| EP | 1093431 | | 5/2003 | |
| GB | 2338938 | * 12/2000 | ................ B62J 6/00 |
| WO | 2021080995 | | 4/2021 | |

OTHER PUBLICATIONS

"International Preliminary Report on Patentability", Application No. PCT/US2020/056516, May 5, 2022, 8 pages.
"Extended European Search Report", EP Application No. 20878693.9, Oct. 25, 2023, 12 pages.

* cited by examiner

APPARATUSES AND METHODS FOR CRANK-BASED LIGHTING

RELATED APPLICATION(S)

This application is a national stage entry of International Application No. PCT/US2020/056516, filed Oct. 20, 2020, which claims the benefit of U.S. Provisional Application No. 62/923,586, filed Oct. 20, 2019, the disclosures which are incorporated herein by reference in their entirety.

BACKGROUND

Bicycles and other pedal-powered transportation are often ridden for recreational purposes or as alternative modes of transportation. In many cases, however, bicycles or other pedal-based vehicles share riding areas (e.g., paved paths or roadways) with motorized vehicles, such as motorcycles, cars, trucks, vans, buses, and the like. When accidents occur between bicycles and motorized vehicles, a bicycle rider is much more likely than a driver to sustain bodily injury, as the bicycle rider is typically exposed or unprotected in comparison with the driver of a heavier motorized vehicle. For example, in recent years, bicyclist fatalities have risen in terms of both absolute numbers and percentage of motor vehicle related accidents as shown in Table 1.

TABLE 1

Total Fatalities and Pedalcyclist Fatalities in Traffic Crashes, 2007-2016

| Year | Total Fatalities | Pedalycyclist Fatalities | Percentage of Total Fatalities |
|---|---|---|---|
| 2007 | 41,259 | 701 | 1.7% |
| 2008 | 37,423 | 718 | 1.9% |
| 2009 | 33,883 | 628 | 1.9% |
| 2010 | 32,999 | 623 | 1.9% |
| 2011 | 32,479 | 682 | 2.1% |
| 2012 | 33,782 | 734 | 2.2% |
| 2013 | 32,893 | 749 | 2.3% |
| 2014 | 32,744 | 729 | 2.2% |
| 2015 | 35,485 | 829 | 2.3% |
| 2016 | 37,461 | 840 | 2.2% |

Source: Fatality Analysis Reporting System (FARS) 2007-2015 Final File, 2016 Annual Report File (ARF).
https://crashstats.nhtsa.dot.gov/Api/Public/ViewPublication/812507

As such, the use of bicycles or other pedal-powered transportation in proximity with motorized vehicles can be dangerous, and conventional bicycle safety equipment, such as helmets and reflectors, leave much to be desired with respect to improving rider safety and preventing accidents.

SUMMARY

This summary is provided to introduce subject matter that is further described in the Detailed Description and Drawings. Accordingly, this Summary should not be considered to describe essential features nor used to limit the scope of the claimed subject matter.

This disclosure is directed to apparatuses of and methods for crank-based lighting, which may improve visibility of pedal-based vehicles or conveyances. In some aspects, a light generating apparatus includes a crank interface and lighting system. The crank interface may facilitate mounting of the apparatus to a crank (or crankarm) of a bicycle or other pedal-based vehicle. The lighting system may generate or emit light based on information indicating an angle, movement, or position of the crank, such as to cause light emission to emulate or project leg movement of a rider (e.g., biomotion).

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of crank-based lighting are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
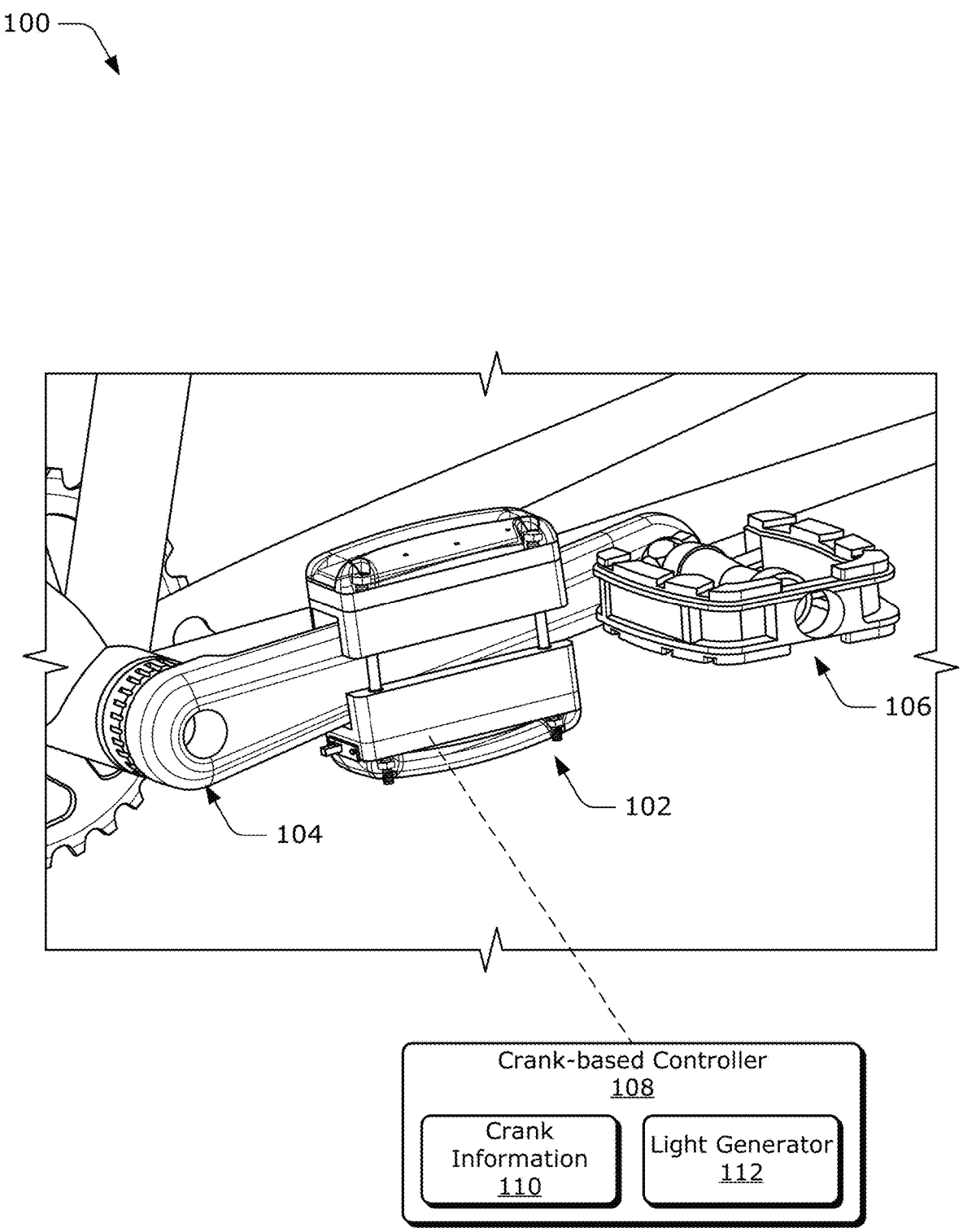
FIG. 1 illustrates an example operating environment in which aspects of crank-based lighting are implemented.

Conventional techniques for bicycle safety or nighttime visibility often rely on lights that attach directly to stationary portions of a pedal-based vehicle (e.g., a bicycle). For example, current lighting designs are fixed on a frame of the bicycle or designed to attach to the rigid parts of the bicycle, such as under a seat or on the handlebars of the bicycle. These static or stationary lights, however, fail to convey movement associated with leg movement of a rider, which is more-easily seen from a distance. As an attempt to address this deficiency, some in the bicycle industry have provided reflective materials that attach to bike shoes, ankles, or combination shoe/ankle covers for rider. Alternately, others have lights available for attachment to shoes and ankles, but these, like the reflective materials, must be put on by the rider each time the bicycle is ridden. As such, these solutions are often inconvenient, cumbersome, often forgotten, or not popular with most bicycle riders.

In contrast with these conventional techniques, this disclosure describes aspects of crank-based lighting, which may improve visibility or safety for bicycles or other pedal-based vehicles. In some aspects, a crank-based light or lighting system attaches to a bicycle crank arm, which may include any suitable area between a pedal and central crankshaft. The crank-based light may include multiple light elements (e.g., light-emitting diodes) facing forward and backward. As such, the crank-based light may be implemented to provide lighting that appears to move "up and down" when the pedal is rotated (e.g., as viewed from the front or back). As a result, a crank-based lighting device is able to provide more visibility to other people (e.g., motorists, pedestrians, other bicyclists, or the like) than conventional bicycle reflectors or lights.

Generally, the crank-based lighting device may project, emphasize, or amplify the "up and down" motion of a bicyclist's lower extremities through flashing (or non-constant) light elements and visibly presenting "biomotion," that is to ensure the up and down motion of leg movement is easily seen or perceivable over various distances (e.g., at greater distances than traditional reflectors or static lights). For example, some research has shown that these two features (non-constant lights and biomotion) are an effective way to reduce cycling injuries or accidents. Through aspects of crank-based lighting, a variety of techniques and apparatuses provide convenient ways for illuminating biomotion of the bicyclist's legs, which increases visibility of the bicyclist and his or her bicycle. By do doing, motorists are better able to see and/or avoid the bicyclist due to the illuminated biomotion provided by the crank-based lighting system.

In addition, the described aspects may also enable instantaneous measurement (e.g., direct measurement) of an absolute number of rotations and/or a rotational rate of the crank, which are measurements cycling enthusiasts would like to have available. For example, by implementing a crank-based lighting system with x-y accelerometers and a wireless transceiver, an indication of cycle count and/or cycle rate associated with the crank can be transmitted to a bicycle computer or the cyclist's smart-phone, which may include an application designed to interpret the received indication. Such functionality would be similar for a cyclist as it would be for measuring the number of steps taken with fitness tracking applications. These are but a few examples of crank-based lighting and other crank-based applications, others of which are described throughout the disclosure.

The following discussion describes an operating environment, techniques that may be employed in the operating environment, and a printed circuit board assembly in which components of the operating environment can be embodied. In the context of the present disclosure, reference is made to the operating environment by way of example only.

Operating Environment

FIG. 1 illustrates an example operating environment 100 having a lighting device 102 implemented in accordance with aspects of crank-based lighting. The lighting device 102 may be mounted to a bicycle crank arm 104, such as between any suitable area that extends from a crank shaft to a pedal 106 of a bicycle or other pedal-based vehicle. In this example, the lighting device 102 includes a crank-based controller 108 having crank information 110 and a light generator 112. The crank-based controller 108 may be implemented using any suitable processor core, microcontroller, programmable logic controller (PLC), or the like. Although not shown, the crank-based controller 108 may include or be associated with a memory on which the crank information 110 or other data is stored. In some cases, the crank information 110 includes sensor data or information regarding an angle, a movement, and/or a position of the crank. Alternately or additionally, the crank information 110 may also include a crank revolution count, crank revolution rate, crank speed, geometry information associated with the crank, or the like.

In some aspects, the light generator 112 is configured to cause, based on the crank information 110, lighting elements of the lighting device 102 to generate or emit light in both forward and backward directions. By so doing, the lighting device 102 may provide more visibility to other people, such as motorists, pedestrians, other bicyclists, or the like, than other types (e.g., stationary) of bicycle reflectors or lights. Generally, this rechargeable lighting device 102 may be attached (e.g., permanently or via removable hardware) to the bicycle crank arm 104 between the pedal 108 and the central crankshaft. The described aspects therefore enable a crank-mountable lighting system that appears to move "up and down" when the crank and/or pedals are rotated as viewed from the front or back. As noted, providing illumination of this type of motion may increase visibility of bicycle riders as it provisions for active light motion of the up and down biomotion of the rider's legs.

Figure 2:
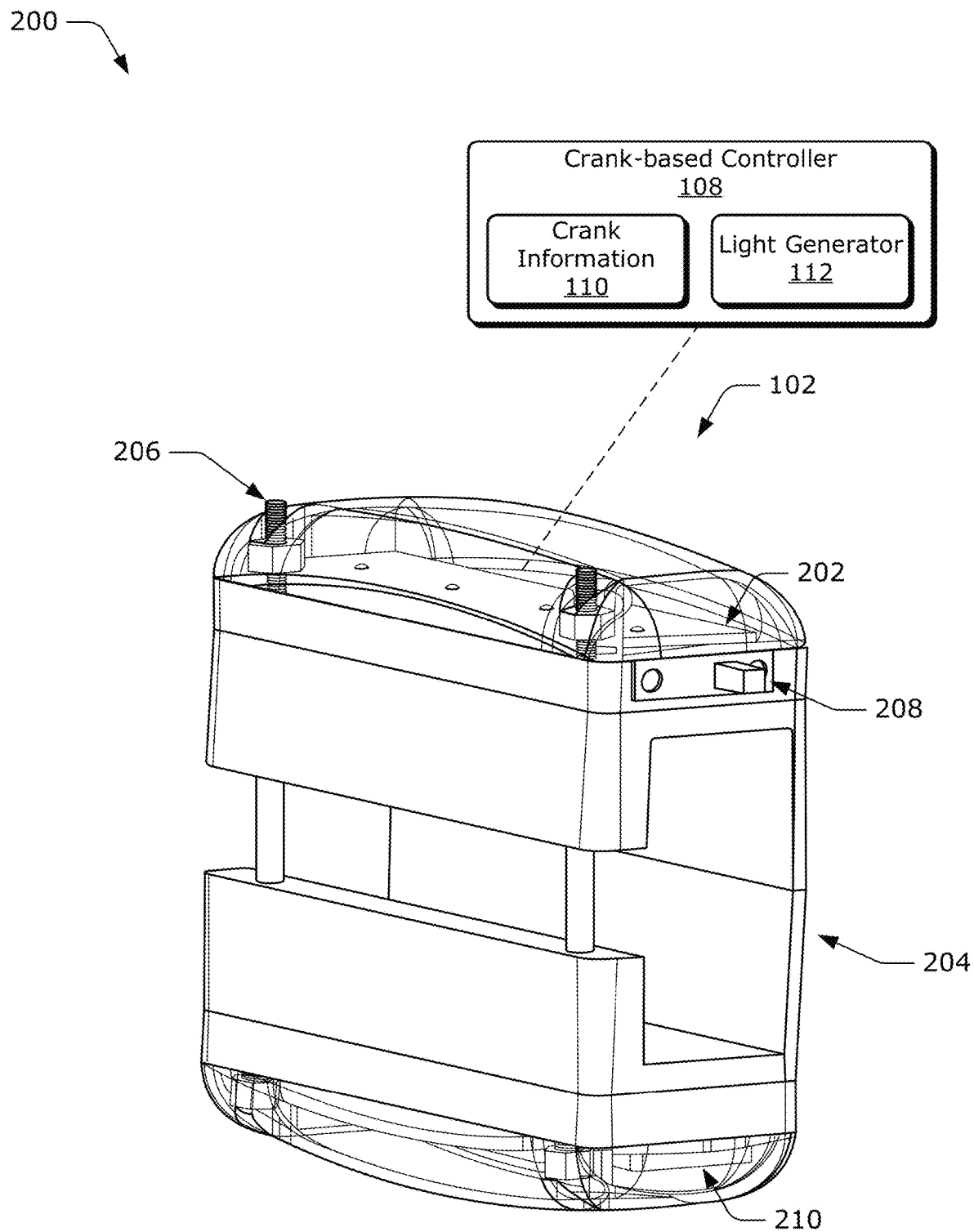
FIG. 2 illustrates an example assembly of a crank-based lighting device in accordance with one or more aspects.

FIG. 2 illustrates at 200 an example assembly of a lighting device 102 implemented in accordance with one or more aspects. Generally, a crank-based lighting device may be implemented as any suitable combination of a mounting interface, lighting elements, and circuitry to power or drive the lighting elements. In this example, the lighting device 102 includes a printed circuit assembly 202, a mounting interface 204, mounting hardware 206 (e.g., tool or toolless hardware), an input switch 208, and another printed circuit assembly 210. In this example, an instance of the crank-based controller 108 may be embodied on either or both of the printed circuit assemblies 202 and 210, which may include printed circuit boards (PCBs) or flexible printed circuits (FPCs). The crank-based controller 108 and other components, such as the crank information 110 and light generator 112, can be implemented as hardware, firmware, fixed logic circuitry, or any combination thereof.

In some aspects, the mounting interface 204 enables attachment of the lighting device 102 to the crankarm of the bicycle pedal via the mounting hardware 206, such as between the pedal and crankshaft. Although shown with a clamp-like or crank-capturing interface (e.g., with screws or a ratcheting system), the lighting device 102 may also include a mounting interface that enables attachment directly to a crank configured to receive the lighting device 102, such as with mounting bosses, protrusions, threaded holes, adhesives, magnets, ferrous inserts (e.g., magnetic material), or the like. In other aspects, the lighting device 102 may be integrated directly with or into a crankarm or fastened to the crank with elastic, silicone, hook/loop, a ratcheting assembly, or otherwise adjustable straps (e.g., for low-profile mounting).

The lighting device 102 may be installed with a mounting interface or mechanism that allows the light to be mounted and recharged in place (e.g., on the crank and/or via a solar-based power source), or with a housing enclosing or capturing a battery (or battery pack or capacitor) configured to enable removability and recharging while detached from the lighting device. The attachment of the lighting device 102 may require the pedal removal or not, depending on how the mechanism attaches to the crankarm. In some aspects, at least one of the lighting device 102 or the mounting interface 204 has a flexible structure on the crankshaft facing side(s) to allow attachment to a variety of crankshaft cross-section designs or geometries. For example, a portion of the mounting interface 204 may be formed from a non-rigid material, which may enable various degrees of articulation or compression of the mounting interface 204, chassis, and/or enclosure of the lighting device 102.

The lighting device 102 includes lighting elements, which may be embodied on multiple sides of the lighting device. In some cases, the printed circuit assemblies 202 and 210 each include multiple surface mount or edge mount light-emitting diodes (LEDs). For example, the lighting device 102 may include lighting elements, light bulbs, lights, or LEDs (collectively "lighting elements") oriented from the mounting interface, chassis, and/or enclosure that surrounds the crankshaft, with the lighting elements facing towards a front and a rear of a bicycle when the crankarms are vertical or approximately vertical (e.g., near or at a top or bottom of pedal stroke). In some cases, the lighting elements are covered by clear housings that both protect the lighting elements and circuitry of the lighting device 102, while also allowing light emitted from the lighting elements to be seen externally. Although not shown, enclosures for the printed circuit assemblies 202 and 210 may also include optical lenses or diffusors to direct or spread the light generated by the lighting elements. In such cases, an optical lens or diffusor may also be integrated into a clear or non-opaque enclosure or cover of the lighting device 102.

In some aspects, the lighting device 102 includes a gasket or gasketing material between the clear housing and the mechanical base (e.g., mounting interface or chassis) to prevent water and dust intrusion into the lighting device (e.g., sealing the printing circuit assemblies and battery interface). The lighting elements may be installed as far to the outside of the lighting device 102 or crankarm as possible, effective to maximize perception of vertical motion associated with pedal rotation. Generally, printed circuit assemblies 202 and 210 are mounted within a mechanical housing or enclosure and may include the battery (or battery interface), recharging circuitry, and sensors to enable sensing or determination of motion associated with the crank or pedals. These printed circuit assemblies may also contain accelerometers and a radio transceiver (e.g., transmitter) to respectively sense and/or communicate crank information, such as a number of revolutions or rate of revolutions of the crankarm for use in determining revolutions of the pedals during use of the bicycle. The input switch 208 may be implemented as a multi-position switch having at least two positions for on/off functionality, as well as other mode or light pattern selections.

In some implementations, the lighting device 102 includes one on/off switch and a power/recharging port than enables charging of the battery or use of an external power supply (e.g., add-on or auxiliary battery pack). Alternately or additionally, circuitry and logic of the lighting device 102 may also enable autodetection of rotation for power management (e.g., auto on/off). The input switch 208 may be implemented as a sealed all-weather design switch, and the recharging port may include a flexible cover to protect it from elements while riding. In some cases, the lighting device 102 may also include an internal inductive charging receive element (beneath/enclosed in plastic), such as to enable wireless charging of the battery of the lighting device 102 and precluding the need to seal an exposed charging port.

By way of example, consider a use case in which a rider may use a lighting device 102 implemented in accordance with one or more aspects. Generally, a user or rider will get a lighting device (with mounting hardware) and install the lighting device on the pedal of their choice. Preferably, this may be the left side in countries where cars drive on the right side of the road, or on the right side in countries where cars drive on the left side of the road. Through use of the charging port or installation of a charged battery, the lighting device may be charged to or near its maximum battery capacity (e.g., for optimal run-time), and when the rider is ready to ride, they can turn the lighting device on using the switch or simply start pedaling (e.g., motion detect auto-on). Lighting elements on both sides of the lighting device or crankshaft may illuminate all of the time, such that the rider, when viewed from behind or from the front, will be seen to have a light moving "up and down" as the pedals are rotated. As discussed, this vertical motion of the light is easily viewable from the front and/or back and provides the "biomotion" reference that differentiates this system from other types of bicycle lighting or reflectors. Alternately or additionally, if configured with an accelerometer and radio transmitter, the revolution count or rate from the rider's effort can be captured for data that corresponds to the number of revolutions exerted during the time of the ride.

In other aspects, the lighting device may be attached to a pedal, such as on the narrow portion where the pedal couples to the crank or at an end of the pedal or pedal shaft. In yet other aspects, the lighting device may include or be implemented as a disc around the crankshaft, on the inside a crank arm that would have circumferential lighting elements around it. These lighting elements may be activated based on a detected position or location of the crankarm as it spun around, to provide light in primarily forward and backward directions.

Figure 3:
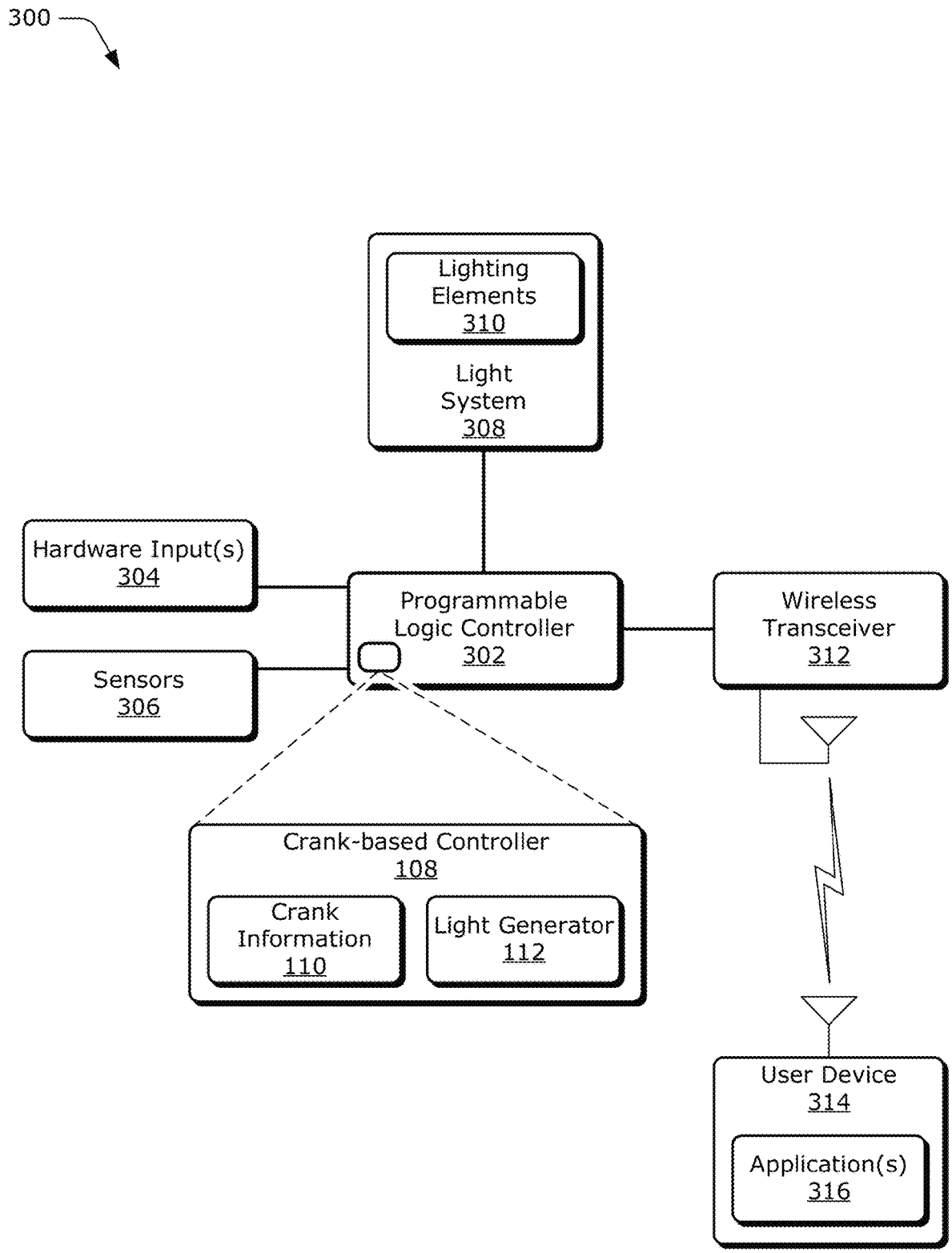
FIG. 3 illustrates an example configuration of components for implementing crank-based lighting or other crank-based features in accordance with one or more aspects.

FIG. 3 illustrates at 300 an example configuration of components for implementing crank-based lighting or other crank-based features in accordance with one or more aspects. The components of FIG. 3 may be implemented on one or more printed circuit assemblies, such as printed circuit assemblies mounted on or proximate opposing sides of a crank or crank arm. In some cases, at least some of the components are embodied on a flexible printed circuit that is configured to be positioned or wrapped around two or more sides of a crankarm.

In this example, the components of a lighting device include a programmable logic controller 302 (PLC 302), hardware inputs 304, and sensors 306. The PLC 302 may be configured to include or implement a crank-based controller 108, crank information 110, and/or a light generator 112. For example, the PLC 302 may include logic or algorithms to implement various aspects of crank-based lighting, such as crank position determination and activation of lighting elements. The crank information 110 may include sensor data or information regarding an angle, a movement, and/or a position of the crank. Alternately or additionally, the crank information 110 may also include a crank revolution count, crank revolution rate, crank speed, geometry information associated with the crank, or the like.

The light generator 112 may include one or more light patterns or algorithms useful to activate lighting elements of the lighting device. For example, the light generator 112 may be configurable to provide lighting signals of different durations, intervals, or duty cycles to control the lighting elements of the lighting device. The hardware inputs 304 may include hardware switches or buttons for various functions, such as on/off or mode selection functions. For example, the hardware inputs 304 may include a multi-position switch or multiple switches that enable a rider to select different modes of operation (e.g., wireless connections) or light patterns (e.g., various strobes or duty cycles of the light generator 112).

The sensors 306 may includes any suitable type of sensor that provides signals or data useful to the PLC 302 for determining motion or position of the crank. For example, the sensors 306 may include one or more of a mercury switch, centrifugal sensor, accelerometer, gyroscope, magnetometer, light sensor, magnetic sensor, hall effect sensor, microelectromechanical systems (MEMS)-based sensor, or the like. In some cases, the sensors include a magnetic sensor or light sensor for detecting a magnetic reference (e.g., magnet) or optical reference (e.g., reflector or flag) positioned on a frame of the bicycle. Alternately or additionally, the sensors 306 may include sensor references that could be sensed by a sensing mechanism mounted on the frame. In at least some aspects, the PLC 302 or crank-based controller 108 generates or determines crank information based on signals or data received from the sensors 306.

The components may also include a light system 308 having lighting elements 310, as well as a wireless transceiver 312. The light system 308 may include power management, drive circuits, or control circuitry for the lighting elements 308. For example, the light system 308 may include power regulation or charge pumps for driving LED-based lighting elements 310 (e.g., colored, multi-colored, or white LEDs). Alternately or additionally, the light system 308 may include logic or circuitry for pulsing, strobing, or progressively illuminating one or more of the lighting elements 310 (e.g., shifting or expanding light pulses).

Generally, the wireless transceiver 312 or a wireless transmitter of the lighting device may communicate crank information or other data to a remote user device 314 or a remote display module, such as one associated with a bicycle-mounted computing device. For example, by using x-y accelerometers and the wireless transceiver 312 of the lighting device, a cycle count and/or rate can be transmitted to the user device 314 and applications 316 of the user device 314 can interpret the information or signals to provide various metrics to a cyclist. As such, the lighting device may provide functionality for a cyclist that is similar to measuring a number of steps taken with fitness tracking applications. This is but one example configuration for implementing a crank-based lighting device, many others of which may be implemented in various fashion without departing from the aspects of this disclosure.

In some aspects, the sensors 306 and/or wireless transceiver 312 are configured to implement fall or crash detection, which may generate or communicate an alert to an emergency response service or contact of a rider. For example, accelerometers or gyros of the lighting device 102 may detect a fall or crash event based detection of orientation, g-forces, or shock that exceed a respective threshold for fall or crash detection. In response to the detected event, the crank-based controller 108 may enter a fall or crash state (e.g., emergency state) in which the lighting device 102 causes the wireless transceiver 312 to transmit a request for assistance to an emergency service provider or contact of the rider. In some cases, the lighting device 102 causes an application 316 on the user device 314 to transmit a request or alert via a cellular or other wide area transceiver of the user device 314. A request or alert for assistance may also include a location or coordinates of the lighting device 102 (and rider), such as based on a global positioning sensor of the lighting device 102 or the user device 314. Alternately or additionally, the lighting device 102 may enter an alert state in which the lighting elements 310 are strobed or flashed (e.g., at maximum brightness or different color) or an audible alert or siren is generated by an speaker or audio output of the lighting device 102.

Figure 4:
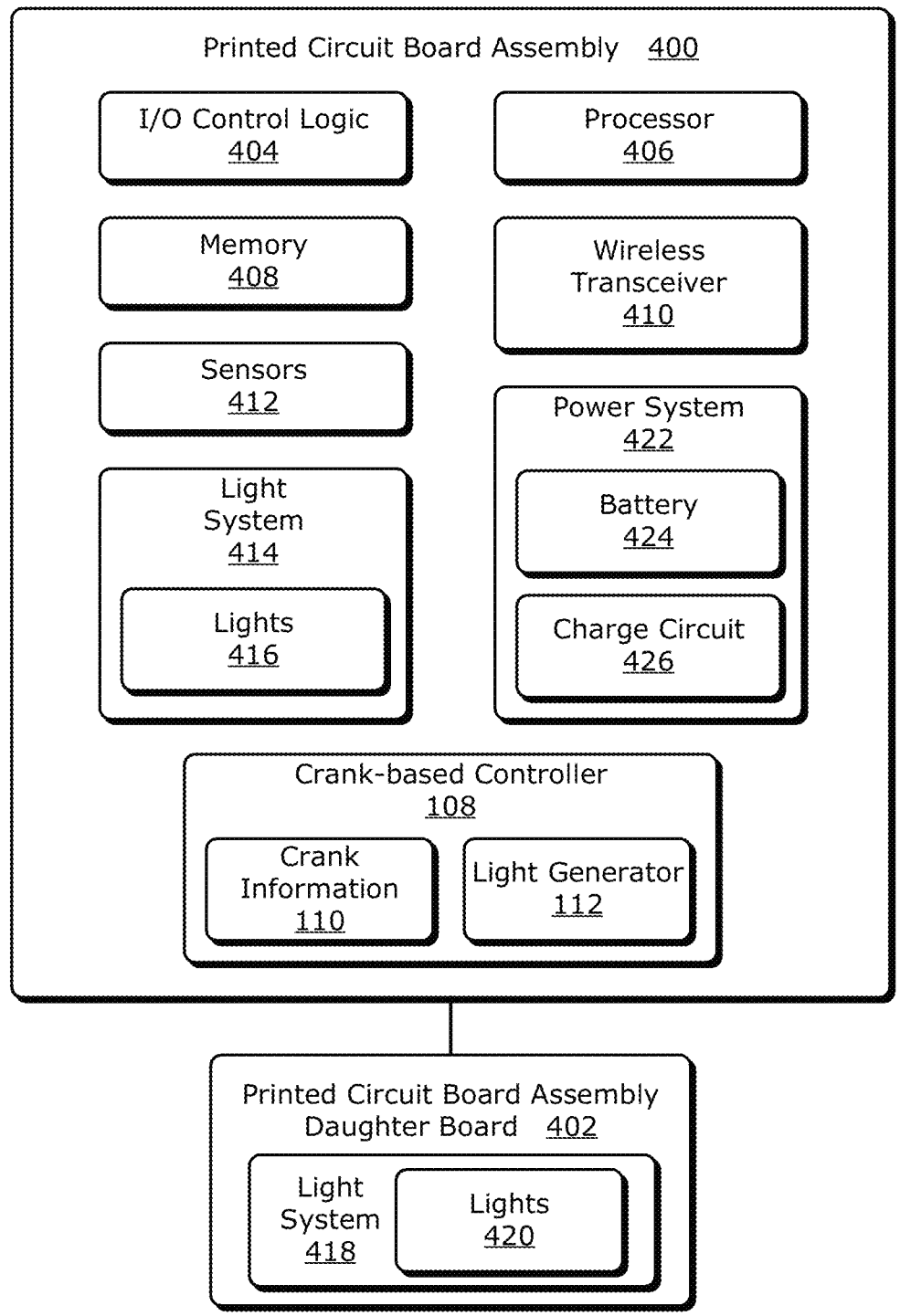
FIG. 4 illustrates example configurations of printed circuit board assemblies through which aspects of crank-based lighting may be implemented.

FIG. 4 illustrates example configurations of a printed circuit board assembly 400 (PCBA 400) and a PCBA daughter board 402 through which aspects of crank-based lighting may be implemented. Although shown as separate entities, the components of the PCBA 400 and PCBA daughter board 402 may be implemented in combination on one printed circuit assembly, such as a flexible printed circuit assembly. In some aspects, a lighting device or apparatus may include a combination of one or more PCBAs or flexible printed circuits on which the components are embodied within or around an enclosure.

The PCBA 400 may include components integrated with various electronic circuitry, a microprocessor, memory, input-output (I/O) control logic, communication interfaces, firmware, and/or software useful to provide functionalities of crank-based lighting. The PCBA 400 may also include an integrated data bus or interconnect fabric (not shown) that couples the various components of the PCBA for data communication between the components. In this example, the PCBA 400 includes various components such as input-output (I/O) control logic 404 and a processor 406, such as a microprocessor, processor core, application processor, DSP, PLC, or the like.

The PCBA 400 also includes memory 408, which may include any type and/or combination of RAM, SRAM, DRAM, non-volatile memory, ROM, one-time programmable (OTP) memory, Flash memory, and/or other suitable electronic data storage. In the context of this disclosure, the memory 408 stores data, instructions, or other information via non-transitory signals, and does not include carrier waves or transitory signals. The memory 408 of the PCBA 400 may also include firmware, applications, state machines, lighting algorithms, crank monitoring algorithms, programs, software, and/or operating system, which can be embodied as processor-executable instructions maintained on the memory for execution by the processor 406 to implement aspects of crank-based lighting or other crank-based features.

In this example, the PCBA 400 also includes a wireless transceiver 410, sensors 412, and a light system 414 having lights 416. In some aspects, the wireless transceiver 410 is employed to transmit crank information 110 or other data to a remote user device or display. This information may be used to display crank-based metrics, such as distance or rate travelled by the cyclist (or raw crank revolution/rate information). The sensors 412 may include any suitable type of sensors, such as those described throughout the disclosure that are useful for sensing or determining motion, movement, acceleration, displacement, or the like.

The light system 414 may include drive circuitry or control logic for the lights 416 of the PCBA 400. Any of these components may also be implemented on the PCBA daughter board 402, which in this example includes another light system 418 and lights 420. In some aspects, operation or activation of the lights 416 and lights 420 are synchronized by the crank-based controller 108 to illuminate the crank or rider based on movement motion of the crank. For example, the lights 416 and 420 may be positioned on both sides of the lighting device and/or illuminate all of the time, such that the rider when viewed from behind or from the front will be seen to have a light moving "up and down" as the pedals are rotated. As discussed, this vertical motion of the light easily viewable from the front or back that provides the "biomotion" reference that is different from other types of bicycle lighting systems. Alternately or additionally, the lights 416 or lights 420 may be deactivated or turned off when not vertical or visible, such as to conserve battery power or enable flashing or strobing operations of the lights. In some cases, different lights are activated based on an orientation of the lighting system, such that lights at a top or bottom edge of the PCBA 400 are activated with those edges face forwards or backwards (and primary lights are deactivated when not facing forward or backward).

A power system 422 of the PCBA 400 includes a battery 424 and charge circuit 426. Although not shown, the power system 422 may also include power regulation circuitry to provide power at respective voltages suitable for the various components or safety circuitry for the battery 424, such as low-voltage cutoff circuitry to prevent over-discharge of the battery 424. The battery 424 may include a user-replaceable cell, such that rechargeable or non-rechargeable cells may be used as a power source. As such, a rider may charge the battery 424 while assembled in the lighting device or charge the battery 424 while removed, such that charged batteries can be swapped into the lighting device.

The components of the PCBA 400 also include a crank-based controller 108, crank information 110, and light generator 112, which may be embodied as described with reference to various aspects presented herein. Examples of these components and/or entities, or corresponding functionality, are described with reference to the respective components or entities of the environment 100 of FIG. 1 or respective configurations of FIG. 2 or FIG. 3. The crank-based controller 108, crank information 110, and light generator 112 can be implemented independently or in combination with any suitable component or circuitry to implement aspects described herein.

Techniques of Crank-Based Lighting

The following discussion describes various techniques of crank-based lighting and/or information sharing. These techniques can be implemented using any of entities described herein, such as those described with reference to FIGS. 1-4. These techniques include methods illustrated in FIGS. 5 and 6, each of which is shown as a set of operations performed by one or more entities.

The techniques or associated aspects are not necessarily limited to orders of the various operations shown. For example, any of the operations may be omitted, repeated, substituted, or re-ordered to implement various aspects of crank-based lighting or other features. Further, these techniques may be used in combination with one another, whether performed by a same entity, separate entities, or any combination thereof. In the following, reference will be made to the operating environment 100 of FIG. 1 and entities of FIG. 2, FIG. 3, and/or FIG. 4, which is by way of example. Such reference should not be taken as limiting any aspect described with to the described operating environment 100, entities, or configurations, but rather as illustrative of one of many examples.

Figure 5:
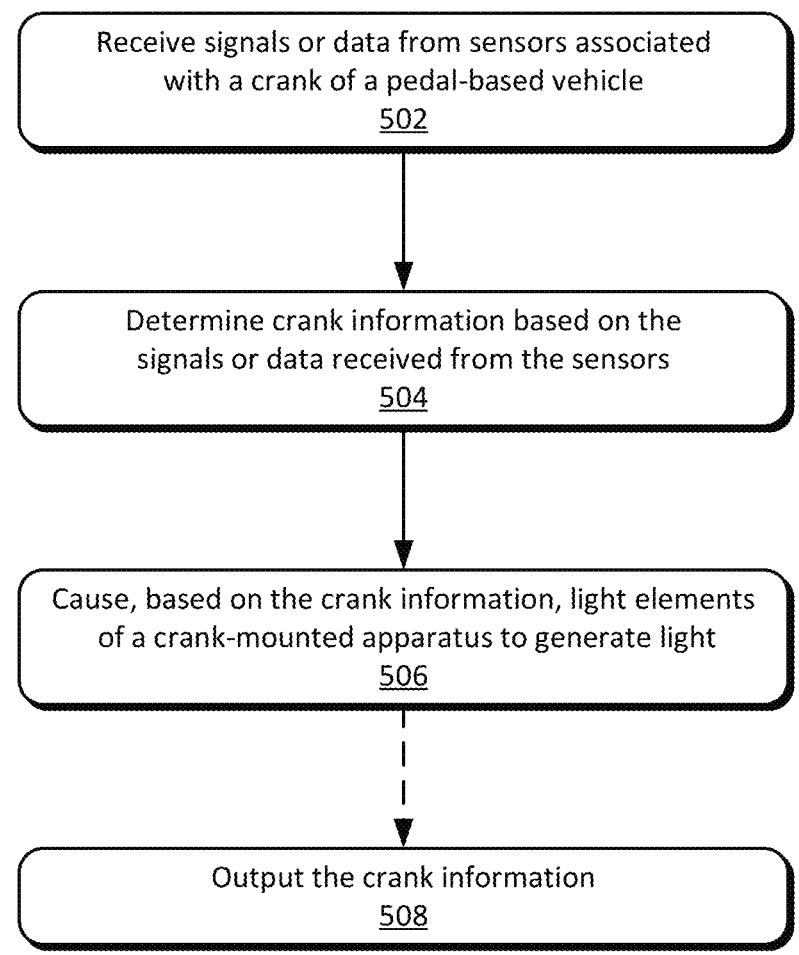
FIG. 5 depicts an example method for implementing crank-based lighting in accordance with one or more aspects.

FIG. 5 depicts an example method 500 for implementing crank-based lighting in accordance with one or more aspects. In some aspects, the method 500 is implemented by the crank-based controller 108 or light generator 112 to generate light that indicates or illuminates an approximate pedaling motion of a pedal-based vehicle (e.g., biomotion or cyclist's leg movement).

At 502, signals or data is received from sensors associated with a crank of a pedal-based vehicle. The signals or the data received from the sensors may indicate relative or absolute movement of the crank. The sensors may include any suitable type of sensors, such as a mercury switch, centrifugal sensor, accelerometer, gyroscope, magnetometer, light sensor, magnetic sensor, hall effect sensor, microelectromechanical systems (MEMS)-based sensor, or the like. For example, the crank-based controller may receive two- or three-dimensional data from an accelerometer, gyro, or MEMS-based motion sensor.

At 504, crank information is determined based on the signals or the data received from the sensors. In some cases, the crank information is determined based on a comparison of prior sensor data with more-recent or current sensor data, such as to determine an updated position or movement of the crank. The crank information may include any suitable type of information related to the crank, such as information regarding an angle, movement, and/or a position of the crank. Alternately or additionally, the crank information may include geometry or dimensional information for the crank or bicycle, such as frame size, wheel/tire size, gearing, currently selected gear, or the like. Such information may be useful to determine a distance travelled or speed of the bicycle.

At 506, light elements of a crank-mounted apparatus are caused to generate light based on the crank information. Generally, the light is generated in response to movement of the crank and may be generated or controlled for light emission when the crank is approximately vertical. In some cases, the light is generated constantly while the crank is determined to be moving. In other cases, the light can be generated whenever the crank is more vertical than horizontal (e.g., from 45° to 135° or from 225° to 315°), such that up and down motion of the rider's legs is illumination or emphasized. Thus, generation of the light may vary with a position or movement of the crank in accordance with one or more aspects.

Optionally at 508, the crank information is output. The crank information may be transmitted to a remote user device or a display module. Alternately or additionally, the crank information or an indication thereof may be emitted as an audible signal or coded audio. For example, a rider may configure the lighting device to emit pacing chirps based on a rate of crank revolutions or distance intervals. In some cases, the described aspects may also enable instantaneous measurement (e.g., direct measurement) of an absolute number of rotations and/or a rotational rate of the crank, which are measurements cycling enthusiasts would like to have available. For example, by implementing a crank-based lighting system with x-y accelerometers and a wireless transceiver, an indication of cycle count and/or cycle rate associated with the crank can be transmitted to a bicycle computer or the cyclist's smart-phone, which may include an application designed to interpret the received indication. Such functionality would be similar for a cyclist as it would be for measuring the number of steps taken with fitness tracking applications.

FIG. 6 depicts another example method 600 for implementing crank-based lighting in accordance with one or more aspects. In some aspects, the method 600 is implemented by the crank-based controller 108 or light generator 112 to generate light that indicates or illuminates an approximate pedaling motion of a pedal-based vehicle (e.g., biomotion or cyclist's leg movement).

Optionally at 602, input is received to activate a crank-based lighting system (or device). The input may be received from a hardware input, such as a switch or button configured to turn on the crank-based lighting system. Alternately or additionally, the controller may sense an input as a charger being disconnected or a battery being connected to the system. In some cases, a position of a multi-position switch may also indicate a mode or light pattern setting by which the system is to operate.

Optionally at 604, motion is detected to activate the crank-based lighting system. For example, sensors (e.g., accelerometers) may detect motion and transmit a signal or data to a PLC or other controller of the crank-based lighting system.

At 606, the crank-based lighting system in woken based on the input or motion. For example, the PLC can be woken up and set a timer set to detect motion for start-up minimum time to ensure that detected motion is actually part of rotation. The PLC may also use the sensor signals or data to establish an initial position of the crank or pedals established along with a time stamp. In such cases, if continued motion is detected after this start-up minimum time, the PLC may initiate light generation. Alternately or additionally, the PLC or controller may indicate a status of the system, such as a battery level or readiness by a coded audible chirp or various patterns of light pulses. For example, the controller may flash a multi-color LED (e.g., different colors for different indications) or separate LEDs in different colors to indicate a battery level or readiness state of the system.

At 608, a motion detection timer is started. For example, the crank-based controller can start a timer configured to detect motion for start-up minimum time to ensure that detected motion is actually part of rotation.

At 610, signals are received from sensors. The signals or data received from the sensors may be useful to determine or generate crank information. In some cases, the signals or data are received with a time stamp or time-stamped such that changes in sensor data or sensor states can be determined by the PLC or controller of the system. Alternately or additionally, time stamps may be generated and associated with the incoming sensor data or the data may be logged or recorded with time stamps, such as to enable time-based data comparisons for determining crank information.

At 612, crank information is determined based on the sensor signals. In some cases, the crank information is determined based on a comparison of prior sensor data with more-recent or current sensor data, such as to determine an updated position or movement of the crank. The crank information may include any suitable type of information related to the crank, such as information regarding an angle, a movement, and/or a position of the crank. Alternately or additionally, the crank information may include geometry or dimensional information for the crank or bicycle, such as frame size, wheel/tire size, gearing, currently selected gear, or the like. Such information may be useful to determine a distance travelled or speed of the bicycle.

At 614, light is generated based on the crank information. Generally, the light is generated based on or in response to movement of the crank. The light may be generated or controlled for constant light emission or light emission when the crank is approximately vertical. In some cases, the light is generated constantly while the crank is determined to be moving in a fashion that correlates to movement of the bicycle. In other cases, the light can be generated whenever the crank is more vertical than horizontal (e.g., from 45° to 135° or from 225° to 315°), such that up and down motion of the rider's legs is illumination or emphasized. Thus, generation of the light may vary with a position or movement of the crank in accordance with one or more aspects. In various aspects, a rate or pattern of flashing or non-constant light may be generated responsive or based on a rate or position sequence of the crank. For example, a rate of flashing light may increase or decrease with a corresponding increase or decrease in crank rate rotation.

Figure 6A:
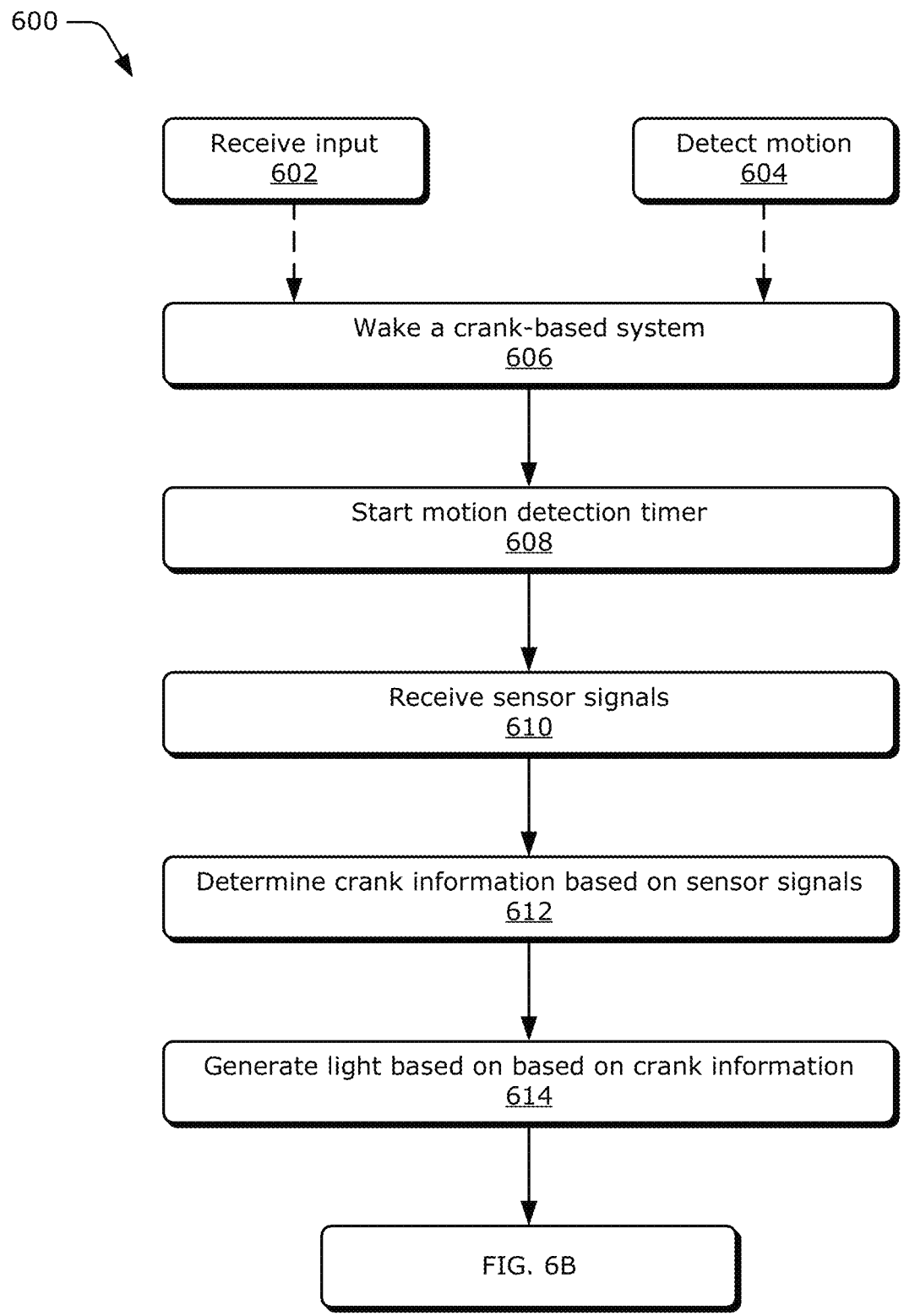
FIGS. 6A and 6B depict another example method for implementing crank-based lighting in accordance with one or more aspects.
Figure 6B:
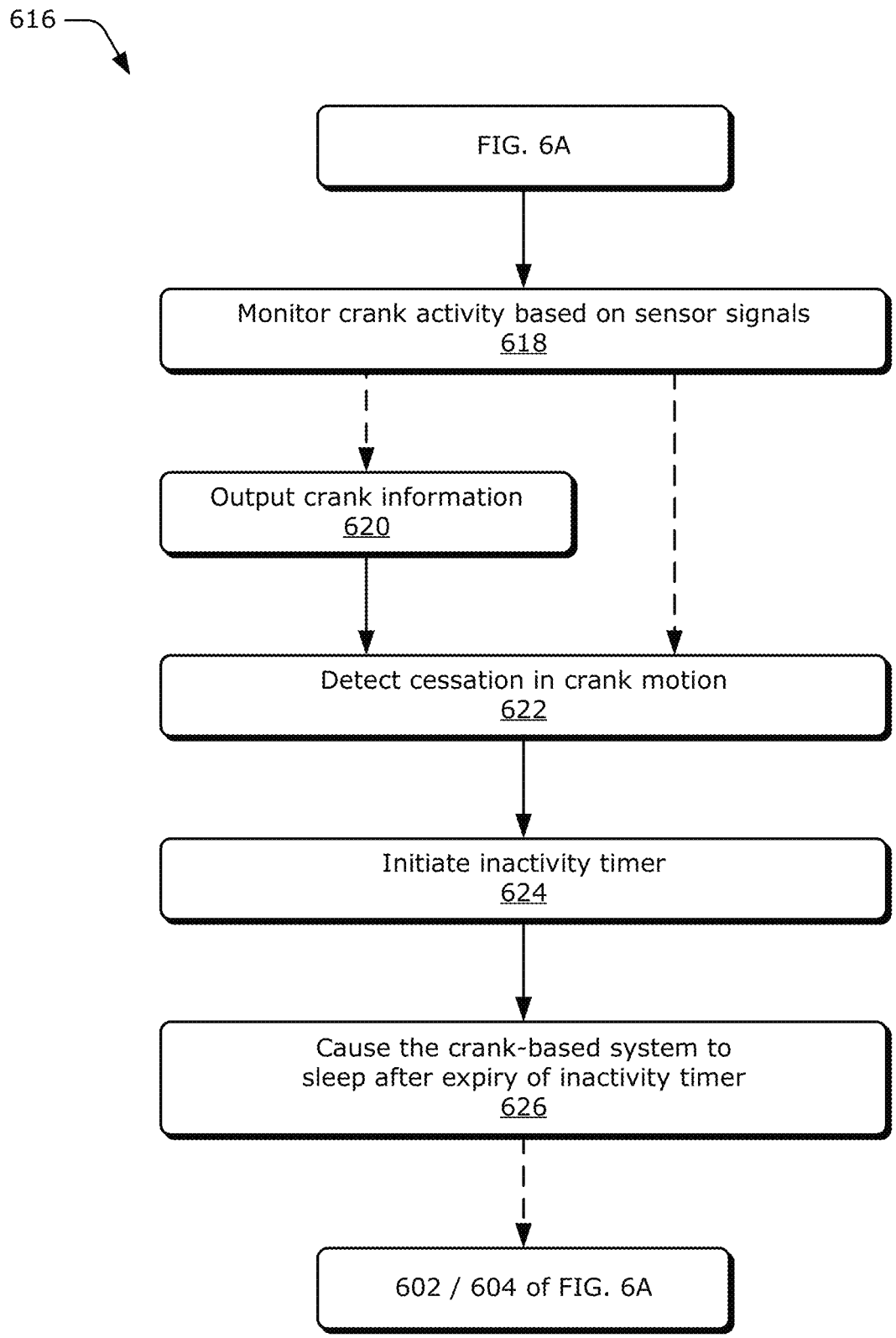

From operation 614 of FIG. 6A, the method 600 may proceed to additional operations of method 600 at 616 of FIG. 6B.

At 618, crank activity is monitored based on the sensor signals. For example, a flow of incoming sensor signals or data may be monitored to determine or calculate additional crank information. For example, a crank revolution counter can be updated by one count for each complete revolution detected via sensors or as determined by the PLC or controller of the system. Alternately or additionally, the crank activity may be monitored to ensure that movement of the crank continues, such as to prevent initiation of an inactivity timer.

Optionally at 620, the crank information is output. The crank information may be transmitted to a remote user device or a display module. Alternately or additionally, the crank information or an indication thereof may be emitted as an audible signal or coded audio. For example, a rider may configure the lighting device to emit pacing chirps based on a rate of crank revolutions or distance intervals. In some cases, the described aspects may also enable instantaneous measurement (e.g., direct measurement) of an absolute number of rotations and/or a rotational rate of the crank, which are measurements cycling enthusiasts would like to have available.

At 622, a cessation in crank motion is detected. For example, when sensors stop sending signals or data that indicates motion, the PLC may determine that movement of the crank has stopped. Alternately, the sensors may detect cessation of motion and send an indication to the PLC to stop counting crank revolutions and to cease generating time stamps for the crank information.

At 624, an inactivity timer is initiated. Once cessation of motion is detected, the PLC or controller may initiate an inactivity timer, during which the lights may continue to operate. In some cases, a light pattern generated by the PLC or controller may change to indicate that the crank-based lighting system has started the inactivity timer. Alternately or additionally, the system may emit an audible alert or chirp to notify the rider that the inactivity timer has started.

At 626, the crank-based system is caused to sleep or power down after expiry of the inactivity timer. Once the inactivity timer expires due to lack of detected motion or user input, the system may power down. For example, after a minimum shutdown time lapses, the PLC may turn off the lights of the system and go to sleep after an additional PLC shutdown timer expires. From operation 626, the method 600 may return to operation 602 or operation 604 to repeat another iteration of the method, such as when subsequent movement of the crank is detected, or the input switch is toggled by the rider.

Although the subject matter has been described in language specific to structural features and/or methodological operations, it is to be understood that the subject matter defined in the appended claims is not necessarily limited to the specific examples, features, or operations described herein, including orders in which they are performed.

In the following, several examples are described:

Example 1. A method for crank-based lighting of a pedal-based vehicle, the method comprising: receiving (502) at least one of signals or data from sensors associated with a crank of the pedal-based vehicle; determining (504) crank information based on the at least one of signals or data received from the sensors; and causing (506), based on the crank information, light elements of an apparatus mounted to the crank of the pedal-based vehicle to generate light.

Example 2. The method as recited in example 1, further comprising transmitting the crank information to at least one of a remote computing device or a remote display module.

Example 3. The method as recited in example 1 or 2, wherein the light generated by the light elements of the apparatus indicates and illuminates a pedaling motion of the pedal-based vehicle.

Example 4. The method as recited in any of examples 1 to 3, further comprising emitting, based on the crank information, an audible signal or coded audio.

Example 5. The method as recited in any of examples 1 to 4, wherein the light elements of the apparatus are caused to generate light constantly while the crank is determined to be moving.

Example 6. The method as recited in any of examples 1 to 4, wherein the light elements of the apparatus are caused to generate light intermittently when the crank is approximately vertical or not horizontal.

Example 7. The method as recited in any of examples 1 to 6, wherein the apparatus is mounted to the crank of the pedal-based vehicle by at least one of a mounting boss on the crank, a protrusion on the crank, a threaded hole of the crank, an adhesive, a magnet, or a ferrous insert of the crank.

Example 8. The method as recited in any of examples 1 to 6, wherein the apparatus is mounted to the crank of the pedal-based vehicle with a clamp-like or crank-capturing interface that uses a screw, a ratcheting system, a strap, a magnet, or an elastomeric material.

Example 9. The method as recited in any of examples 1 to 8, further comprising: detecting, based on the crank information, that motion of the crank has ceased; and in response to detecting that the motion of the crank has ceased, initiating an inactivity timer.

Example 10. The method as recited in example 9, further comprising ceasing to cause the apparatus to generate light in response to expiry of the inactivity timer.

Example 11. An apparatus comprising: a mounting interface (204) to attach the apparatus to a crank of a pedal-based vehicle; one or more sensors (306) to provide signals indicative of movement of the crank; one or more light elements (310) configured to generate light in response to a control signal; a hardware-based processor (406); and a memory (408) storing processor-executable instructions that, responsive to execution by the hardware-based processor, implements a crank-based controller to: receive (502), from the one or more sensors, the signals indicative of the movement of the crank; determine (504) crank information based on the signals received from the one or more sensors; and cause (506), based on the crank information and via the control signal, the light elements to generate light effective to indicate motion of the crank.

Example 12. The apparatus as recited in example 11, further comprising a wireless transmitter configured to transmit the crank information to at least one of a remote computing device or a remote display module.

Example 13. The apparatus as recited in example 11 or 12, wherein the crank-based controller is configured to generate the light to indicate or illuminate a pedaling motion of the pedal-based vehicle.

Example 14. The apparatus as recited in example 13, wherein the crank-based controller is configured to: determine, based on the crank information, an approximate position of the crank of the pedal-based vehicle; and generate, based on the approximate position of the crank, the light to indicate or illuminate the pedaling motion of the pedal-based vehicle.

Example 15. The apparatus as recited in example 13, wherein the crank-based controller is configured to: determine, based on the crank information, movement of the crank of the pedal-based vehicle; and generate, based on the movement of the crank, the light to indicate or illuminate the pedaling motion of the pedal-based vehicle.

What is claimed is:

1. A method for lighting a pedal-based vehicle, the method comprising:
receiving, by a light-generating apparatus mounted to a crank arm of the pedal-based vehicle, a signal or data from a sensor associated with the crank arm of the pedal-based vehicle, the light-generating apparatus being mounted to the crank arm in an area of the crank arm extending between a crank shaft of the pedal-based vehicle and a pedal operably attached to the crank arm, the light-generating apparatus comprising a battery cell, a first housing portion with a first light element, and a second housing portion with a second light element, the first housing portion configured to engage a leading edge of the crank arm and the second housing portion configured to engage a trailing edge of the crank arm when the first housing portion and the second housing portion are mechanically coupled together to attach the light-generating apparatus to the crank arm;
determining crank arm-related information based on the signal or the data received from the sensor associated with the crank arm, the crank arm-related information indicative of a position of the crank arm or an angle of the crank arm; and
causing, based on the crank arm-related information and with power provided by the battery cell, the first light element of the first housing portion of the light-generating apparatus to generate first light in a forward direction relative travel of the pedal-based vehicle and the second light element of the second housing portion of the light-generating apparatus to concurrently generate second light in a rearward direction relative travel of the pedal-based vehicle.

2. The method as recited in claim 1, further comprising transmitting the crank arm-related information to at least one of a remote computing device or a remote display module.

3. The method as recited in claim 1, wherein the first light generated by the first light or the second light generated by the second light element of the light-generating apparatus indicates or illuminates a pedaling motion of the pedal-based vehicle.

4. The method as recited in claim 1, further comprising emitting, based on the crank arm-related information, an audible signal or coded audio.

5. The method as recited in claim 1, further comprising determining that the crank arm is moving based on the crank arm-related information, and wherein:
the first light element and the second light element of the light-generating apparatus are caused to generate the first light and the second light constantly while the crank arm is determined to be moving, and
the first light element and the second light element of the light-generating apparatus are caused to cease to generate the first light and the second light in response to determining that motion of the crank arm has ceased for a predefined amount of time.

6. The method as recited in claim 1, wherein the first light element and the second light element of the light-generating apparatus are caused to generate the first light and the second light as intermittent light such that at least respective portions of the first light and the second light are generated when the crank arm is approximately vertical, and the respective portions of the first light and the second light are not generated when the crank arm is approximately horizontal.

7. The method as recited in claim 1, wherein the light-generating apparatus is positioned, mounted, or further attached to the crank arm of the pedal-based vehicle by at least one of a mounting boss on the crank arm, a protrusion on the crank arm, a threaded hole of the crank arm, an adhesive, a magnet, or a ferrous insert of the crank arm.

8. The method as recited in claim 1, wherein the first housing portion and the second housing portion of the light-generating apparatus are respectively configured to form a clamp-based or crank-capturing interface that uses a screw, a ratcheting system, a strap, a magnet, or an elastomeric material to attach the light-generating apparatus to the crank arm of the pedal-based vehicle.

9. The method as recited in claim 1, further comprising:
detecting, based on the crank arm-related information, that motion of the crank arm has ceased; and
in response to detecting that the motion of the crank arm has ceased, initiating an inactivity timer.

10. The method as recited in claim 9, further comprising ceasing to cause the light-generating apparatus to generate the first light or the second light in response to expiry of the inactivity timer.

11. An apparatus comprising:
a first housing portion with a first light element;
a second housing portion with a second light element, the first housing portion configured to engage a leading edge of a crank arm and the second housing portion configured to engage a trailing edge of the crank arm when the first housing portion and the second housing portion are mechanically coupled together to provide a mounting interface to couple the apparatus around a crank arm of a pedal-based vehicle, the mounting interface configured to mount the apparatus to an area of the crank arm that extends between a crank shaft of the pedal-based vehicle and a pedal operably attached to the crank arm;
a battery cell;
one or more sensors to provide a signal or data indicative of movement of the crank arm;
a hardware-based processor; and
a memory storing processor-executable instructions that, responsive to execution by the hardware-based processor, implement a lighting controller to:
receive, from the one or more sensors, the signal or the data indicative of the movement of the crank arm;
determine crank arm-related information based on the signal or data received from the one or more sensors of the apparatus, the crank arm-related information indicative of a position of the crank arm or an angle of the crank arm; and
cause, based on the crank arm-related information and with power provided by the battery cell, the first light element of the first housing portion of the apparatus coupled to the crank arm to generate first light in a forward direction relative travel of the pedal-based vehicle and cause the second light element of the second housing portion to generate second light in a rearward direction relative travel of the pedal-based vehicle effective to indicate motion of the crank arm.

12. The apparatus as recited in claim 11, further comprising a wireless transmitter configured to transmit the crank arm-related information to at least one of a remote computing device or a remote display module.

13. The apparatus as recited in claim 11, wherein the lighting controller is configured to generate the first light or the second light to indicate or illuminate a pedaling motion of the pedal-based vehicle.

14. The apparatus as recited in claim 13, wherein the lighting controller is configured to:
determine, based on the crank arm-related information, an approximate position of the crank arm of the pedal-based vehicle; and
generate, based on the approximate position of the crank arm, the first light or the second light to indicate or illuminate the pedaling motion of the pedal-based vehicle.

15. The apparatus as recited in claim 13, wherein the lighting controller is configured to:
determine, based on the crank arm-related information, movement of the crank arm of the pedal-based vehicle; and
generate, based on the movement of the crank arm, the first light or the second light to indicate or illuminate the pedaling motion of the pedal-based vehicle.

16. The apparatus as recited in claim 11, wherein the lighting controller is further configured to:
cause the first light element and the second light element to generate the first light or the second light constantly while the crank arm is determined to be moving, and
cause the first light element and the second light element to cease to generate the first light or the second light in response to determining that motion of the crank arm has ceased for a predefined amount of time.

17. The apparatus as recited in claim 11, wherein the lighting controller is further configured to cause the first light element and the second light element to generate the first light or the second light as intermittent light by:
causing the first light element and the second light element to generate at least respective portions of the first light or the second light when the crank arm is approximately vertical in relation to a surface on which the pedal-based vehicle is operated; and
cease to generate the first light or the second light when the crank arm is approximately horizontal in relation to the surface on which the pedal-based vehicle is operated.

18. The apparatus as recited in claim 11, wherein the mounting interface provided by the first housing portion and the second housing portion to couple the apparatus to the crank arm comprises one of:
a cavity or recess to receive a mounting boss on the crank arm;
a cavity or recess to receive a protrusion on the crank arm;
a boss or standoff to interface with a threaded hole of the crank arm;
an adhesive material; or
a magnet to couple to the crank arm or to a ferrous insert of the crank arm.

19. The apparatus as recited in claim 11, wherein the mounting interface provided by the first housing portion and the second housing portion to couple the apparatus to the crank arm comprises a clamp-based interface or crank-capturing interface that comprises at least one of a screw, a bolt, a ratchet, a strap, a magnet, or an elastomeric material.

20. The method as recited in claim 1, wherein:
the light-generating apparatus mounted to the crank arm of the pedal-based vehicle comprises the sensor from which the signal or the data is received; or
the light-generating apparatus mounted to the crank arm of the pedal-based vehicle comprises a processor that performs at least a portion of the determining of the crank arm-related information based on the signal or the data received from the sensor.

\* \* \* \* \*